US009462140B2

(12) United States Patent
Kadota

(10) Patent No.: US 9,462,140 B2
(45) Date of Patent: Oct. 4, 2016

(54) SCANNER AND NON-TRANSITORY STORAGE MEDIUM STORING INSTRUCTIONS EXECUTABLE BY THE SCANNER

(71) Applicant: Brother Kogyo Kabushiki Kaisha, Nagoya-shi, Aichi-ken (JP)

(72) Inventor: Masatoshi Kadota, Takahama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/669,838

(22) Filed: Mar. 26, 2015

(65) Prior Publication Data

US 2015/0281473 A1 Oct. 1, 2015

(30) Foreign Application Priority Data

Mar. 27, 2014 (JP) ................. 2014-065722

(51) Int. Cl.
*G06F 15/00* (2006.01)
*H04N 1/00* (2006.01)
*H04N 1/32* (2006.01)

(52) U.S. Cl.
CPC ...... *H04N 1/00222* (2013.01); *H04N 1/00973* (2013.01); *H04N 1/32005* (2013.01); *H04N 1/32379* (2013.01)

(58) Field of Classification Search
CPC combination set(s) only.
See application file for complete search history.

(56) References Cited

U.S. PATENT DOCUMENTS

2001/0056406 A1   12/2001   Nagoya et al.

FOREIGN PATENT DOCUMENTS

| JP | H07-105069 A |   | 4/1995 |            |
|----|--------------|---|--------|------------|
| JP | H07105069 A  | * | 4/1995 | ... G06F 12/00 |
| JP | 2002-007103 A |  | 1/2002 |            |

* cited by examiner

*Primary Examiner* — Helen Q Zong
(74) *Attorney, Agent, or Firm* — Banner & Witcoff, Ltd.

(57) ABSTRACT

A scanner includes: a communication device communicable with an information processing device; and a controller. The controller is configured to cause the scanner to execute: a determination processing in which the scanner determines whether a reading request which is a request for reading a pseudo image file is received from the information processing device; a scan executing processing in which the scanner executes a scan processing when the reading request for reading the pseudo image file is received in the determination processing; and a scan-data writing processing in which the scanner writes scan data created in the scan executing processing, into the pseudo image file.

12 Claims, 15 Drawing Sheets

SCANNER AND NON-TRANSITORY STORAGE MEDIUM STORING INSTRUCTIONS EXECUTABLE BY THE SCANNER

CROSS REFERENCE TO RELATED APPLICATION

The present application claims priority from Japanese Patent Application No. 2014-065722, which was filed on Mar. 27, 2014, the disclosure of which is herein incorporated by reference in its entirety.

BACKGROUND

1. Technical Field

The present invention relates to a scanner communicable with an information processing device and to a non-transitory storage medium storing a plurality of instructions executable by a processor of the scanner.

2. Description of the Related Art

In the case where an information processing device such as a PC (Personal Computer) acquires scan data, the information processing device needs to call a driver of a scanner from an application program using an API (Application Programming Interface) to transmit a scan instruction to the scanner using the called driver. That is, a user needs to install the scan driver on the PC in advance.

SUMMARY

Accordingly, an aspect of the disclosure relates to a technique for allowing an information processing device to acquire scan data from a scanner without using a driver.

In one aspect of the disclosure, a scanner includes: a communication device communicable with an information processing device; and a controller configured to cause the scanner to execute: a determination processing in which the scanner determines whether a reading request which is a request for reading a false image file is received from the information processing device; a scan executing processing in which the scanner executes a scan processing when the reading request for reading the false image file is received in the determination processing; and a scan-data writing processing in which the scanner writes scan data created in the scan executing processing, into the false image file.

In another aspect of the disclosure, a scanner includes: a communication device communicable with an information processing device; a storage configured to store a file; and a controller configured to cause the scanner to execute: a reception determining processing in which the scanner determines whether a command for execution of reading of the file is received from the information processing device via the communication device; a scan executing processing in which the scanner executes a scan processing when the scanner determines that the command is received in the reception determining processing; and a scan-data transmitting processing in which the scanner transmits scan data created in the scan executing processing, to the information processing device via the communication device.

In another aspect of the disclosure, a non-transitory storage medium stores a plurality of instructions executable by a processor of a scanner. The scanner includes a communication device communicable with an information processing device. The plurality of instructions, when executed by the processor, cause the scanner to execute: a determination processing in which the scanner determines whether a reading request which is a request for reading a false image file is received from the information processing device; a scan executing processing in which the scanner executes a scan processing when the reading request for reading the false image file is received in the determination processing; and a scan-data writing processing in which the scanner writes scan data created in the scan executing processing, into the false image file.

In another aspect of the disclosure, a non-transitory storage medium stores a plurality of instructions executable by a processor of a scanner. The scanner includes: a communication device communicable with an information processing device; and a storage configured to store a file. The plurality of instructions, when executed by the processor, cause the scanner to execute: a reception determining processing in which the scanner determines whether a command for execution of reading of the file is received from the information processing device via the communication device; a scan executing processing in which the scanner executes a scan processing when the scanner determines that the command is received in the reception determining processing; and a scan-data transmitting processing in which the scanner transmits scan data created in the scan executing processing, to the information processing device via the communication device.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Configuration of Communication System

Figure 1:
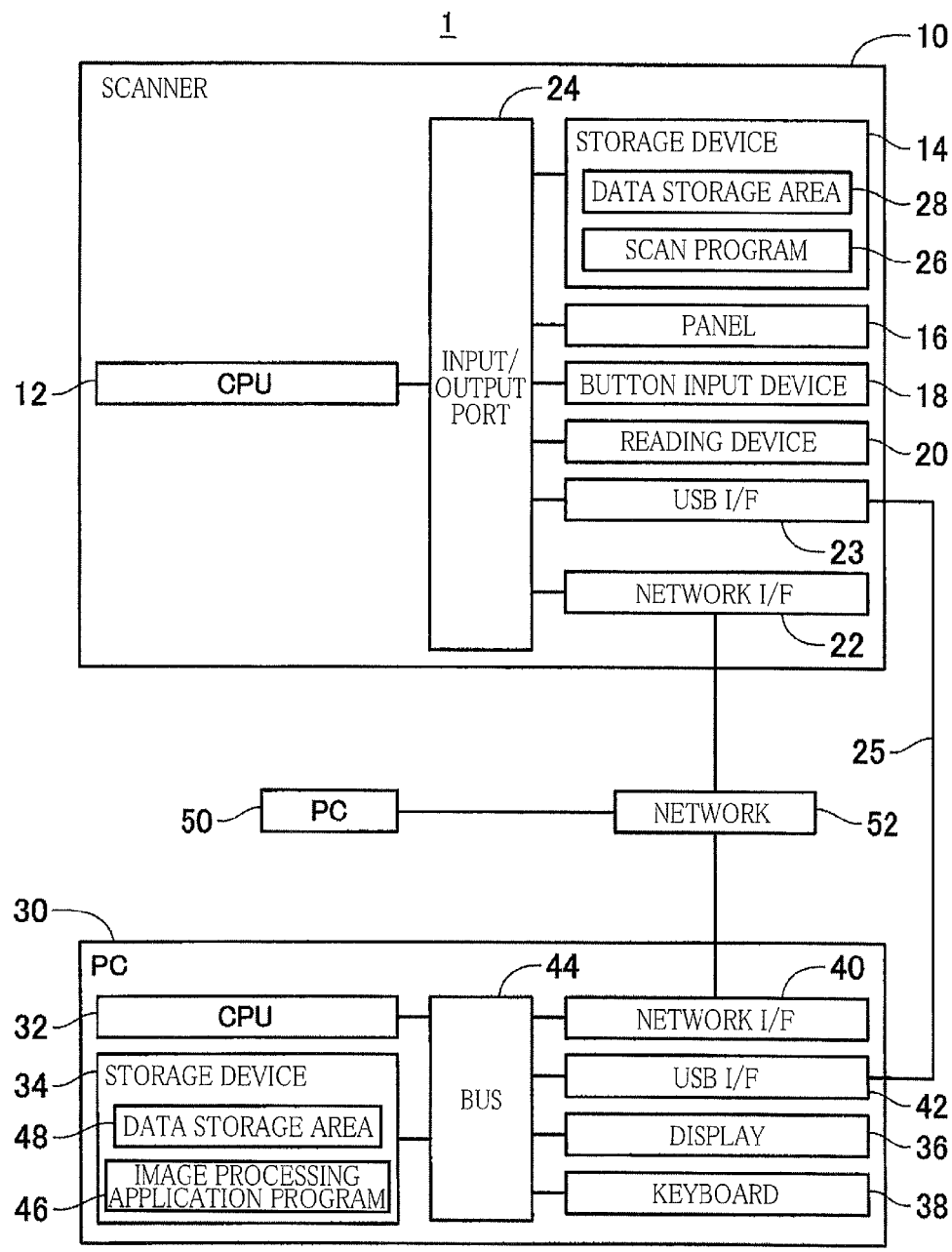
FIG. 1 is a block diagram illustrating a communication system.
Figure 2:
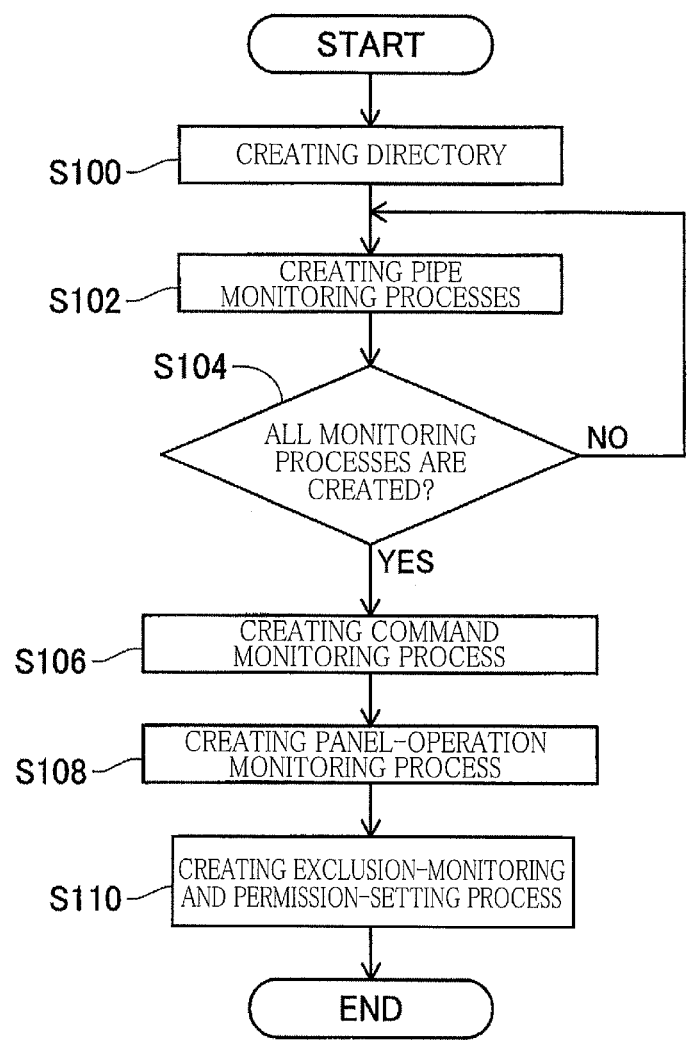
FIG. 2 is a flow chart illustrating processings executed by a scanner.

FIG. 1 illustrates a communication system 1 according to a first embodiment. The communication system 1 includes a scanner 10, a PC (Personal Computer) 30 (as one example of an information processing device), a PC 50, and a network 52.

A configuration of the scanner 10 will be explained. The scanner 10 includes a CPU (Central Processing Unit) 12 (as one example of a controller and a processor), a storage device 14, a panel 16, a button input device 18, a reading device 20, a network interface 22 (as one example of a communication device), and a USB interface 23 (as another example of the communication device). These devices are communicable with each other via an input/output port 24.

The panel 16 has a display surface for displaying various kinds of functions of the scanner 10. The button input device 18 includes keys for execution of the various functions of the scanner 10 and may be provided as a touch panel superposed on the panel 16. The reading device 20 creates image data by scanning a document placed on an ADF (Automatic Document Feeder) or a flat bed.

The network interface 22 can communicate with external devices over the network 52 and is connected to the PCs 30, 50 over the network 52. This configuration allows the scanner 10 to transmit and receive various kinds of data to and from the PCs 30, 50. It is noted that an SMB (Server Message Block) protocol is used in communication between the scanner 10 and the PCs 30, 50 over the network 52.

Also, a USB cable 25 is connected to the USB interface 23, and the USB interface 23 is connected to the PC 30 via the USB cable 25. This configuration allows the scanner 10 to transmit and receive various kinds of data to and from the PC 30. The USB interface 23 includes an interface of a storage class and an interface of a vendor class.

The CPU 12 executes processings according to a scan program 26 (as one example of a plurality of instructions) stored in the storage device 14. The scan program 26 is a program for execution of the scan processing. Hereinafter, the CPU 12 that executes programs such as the scan program 26 may be simply referred to as the name of the program. For example, the wording "the scan program 26 executes" may mean "the CPU 12 that executes the scan program 26 executes".

It is noted that the storage device 14 is constituted by a combination of a RAM (Random Access Memory), a ROM (Read Only Memory), a flash memory, a HDD (Hard Disk Drive), a buffer provided for the CPU 12, and other similar devices. The storage device 14 has a data storage area 28 (as one example of a storage). The data storage area 28 stores various kinds of data including: image data created by the reading device 20; and data required for execution of the scan program 26.

A configuration of the PC 30 will be explained. The PC 30 includes a CPU 32, a storage device 34, a display 36, a keyboard 38, a network interface 40, and a USB interface 42. These devices are communicable with each other via a bus 44.

The display 36 has a display surface for displaying various kinds of functions of the PC 30. The keyboard 38 is provided with keys for execution of the various functions of the PC 30.

The network interface 40 communicates with external devices over the network 52 and is connected to the scanner 10 over the network 52. This configuration allows the PC 30 to transmit and receive various kinds of data to and from the scanner 10. It is noted that the SMB protocol is used in communication between the scanner 10 and the PC 30 over the network 52.

The USB cable 25 is connected to the USB interface 42, and the USB interface 42 is connected to the scanner 10 via the USB cable 25. This configuration allows the PC 30 to transmit and receive various kinds of data to and from the scanner 10. It is noted that a USB storage class is used in the communication between the scanner 10 and the PC 30 via the USB cable 25.

The CPU 32 executes processings according to an image processing application program 46 stored in the storage device 34. The image processing application program 46 is a program for processing image data. Hereinafter, the CPU 32 that executes programs such as the image processing application program 46 may be simply referred to as the name of the program. For example, the wording "the image processing application program 46 executes" may mean "the CPU 32 that executes the image processing application program 46 executes".

It is noted that the storage device 34 is constituted by a combination of a RAM, a ROM, a flash memory, a HDD, a buffer provided for the CPU 32, and other similar devices. The storage device 34 has a data storage area 48 (as one example of a storage). The data storage area 48 is an area for storing various kinds of data including: image data acquired from the scanner 10; and data required for execution of the image processing application program 46.

The PC 50 is substantially similar in configuration to the PC 30 but connected to the scanner 10 over the network 52.

Scan Processing Using Named Pipe

The image processing application program 46 of the PC 30 is configured to read image data and process the image data. This image processing application program 46 does not have a function for calling API of a scanner driver or a function for directly controlling the scanner. Such a program is common in image uploaders and other similar devices. In the present embodiment, a named pipe as one example of a false image file or a pseudo image file is used for causing the image processing application program to read scan image.

The named pipe is a file having the following features:
(1) Data written in the named pipe is read out in first-in-first-out order.
(2) Data read out from the named pipe is deleted from the named pipe.
(3) When file opening is commanded with respect to the named pipe in a write blocking mode, opening processing is delayed until another process performs reading with respect to the named pipe.

This named pipe is common in Unix and Linux (registered trademark).

The scan program 26 is installed on the scanner 10, and the scanner 10 uses the scan program 26 to offer scan image to the image processing application program 46 via the named pipe. The image processing application program 46 uses the SMB protocol or the USB storage class to read the named pipe as the file like a normal image file to read the scan data. A file name of this named pipe is attached with an extension representative of image data such as JPG. An image format representative of the extension coincides with that of the scan data.

A user can perform various kinds of settings by operating the button input device 18 of the scanner 10. One of the settings is a backup mode. In this mode, the scan data utilizing the named pipe is stored into the data storage area 28 of the scanner 10.

When setting of the setting values for the scan processing and setting for the backup mode are performed, the scan program 26 creates directories in the data storage area 28 of the scanner 10 and each set of setting values for the scan processing which are set in a setting mode are set to a corresponding one of the directories. Specifically, for example, two directories are created, and color scanning and a setting value of a resolution of 200×200 dpi are set in a first directory, and black and white scanning and a setting value of a resolution of 400×400 dpi are set in a second directory. In the case where there are a plurality of settings, subordinate directories are created, and the settings are assigned respectively to the subordinate directories. That is, the scan settings are hierarchically managed using the directories.

The named pipe is then created for each created directory. Specifically, according to the scan program 26, the set setting values for the scan processing are read, and the setting values for the scan processing are extracted for each directory. The named pipe is then created for each directory according to the setting values for the scan processing. It is noted that in the case where the backup mode is set in the setting mode, the named pipe whose pipe name (i.e., the name of the pipe) contains information about a serial number is created, and in the case where the backup mode is not set in the setting mode, the named pipe whose pipe name does not contain information about a serial number is created. Upon creation of the named pipe, the blocking mode is set for the created named pipe, and an open processing is executed.

When the scanner 10 is connected to the PC 30 via the USB interface 23, the PC 30 requests the scanner 10 to transmit a descriptor. In response, the scanner 10 transmits a descriptor indicating that the scanner 10 has the storage class and the vendor class. Upon receiving the descriptor, the PC 30 recognizes that the scanner 10 includes a storage device. As a result, in the case where the OS installed in the PC 30 is a Windows (registered trademark), for example, the PC 30 creates a new drive letter (e.g., "E:"). Also, in the case where the scanner 10 is connected to the PC 30 via the network interface 22, the PC 30 recognizes, based on a file sharing protocol such as the SMB protocol, that a storage device is connected to the CPU 30. The PC 30 recognizes that the directory and the named pipe are stored in a new recording apparatus recognized in this manner.

In the case where the named pipe is read by the image processing application program 46 of the PC 30, the setting values for the scan processing which are set for the named pipe are acquired according to the scan program 26. Then, a scan processing is executed by the scan program 26 based on the acquired setting values, and scan data is created in the scan processing. The scan program 26 writes the scan data, which is created in the scan processing to the named pipe read by the image processing application program 46. Accordingly, the scan data written in the named pipe is acquired using the image processing application program 46 of the PC 30. That is, the image processing application program 46 of the PC 30 can read the scan data created by the scanner 10 with the same operation as performed in reading of a normal image file stored in the data storage area 28. This configuration allows the PC 30 to acquire the scan data from the scanner 10 without using any scanner driver. Also, since no scanner driver is required, the scanner 10 can perform scanning without depending upon architecture of the PC 30 (i.e., a type of a CPU) or a platform (i.e., a type of an OS). It is noted that the PC 30 may use any of the SMB protocol and the USB storage class to read the named pipe.

That is, the PC 30 can read the named pipe over the network 52 and via the USB cable 25.

When the scan data written in the named pipe is acquired by the PC 30, the named pipe is switched to an inactive state in which the named pipe cannot be used. That is, the named pipe is closed. The named pipe is then deleted from the data storage area 28. However, after the named pipe being deleted, another named pipe is created again so as to be in a usable state in the above-described manner. In the case where the backup mode is set, the scan data written in the pipe that has been deleted is stored into the data storage area 28 under the same name as that of the pipe. It is noted that when a new named pipe is created, the serial number is incremented. As a result, the scan data remains under the same name as that of the named pipe used for reading.

The image processing application program 46 of the PC 50 has the function for calling the API of the scanner driver and can transmit a scan instruction to the scanner 10. Thus, when having received a scan instruction from the PC 50, the scanner 10 executes a scan processing. In the case where the scanner 10 is connected to the PC 50 via the USB, reading using the function for calling the API is performed via the interface of the vendor class. Also, the scanner 10 may execute a scan processing according to a user operation performed on the button input device 18 of the scanner 10. Specifically, an input waiting screen, not shown, is normally displayed on the panel 16 of the scanner 10, and the input waiting screen contains a scan-processing execution button, not shown. The scanner 10 executes a scan processing in response to a user operation performed on the scan-processing execution button.

As thus described, the scanner 10 can execute three types of scan processings, namely, a scan processing utilizing the named pipe, a scan processing according to a scan instruction transmitted from the PC 50, and a scan processing according to a button operation performed on the scanner 10. A plurality of processings of these three types of scan processings may be input, and in this case, a processing which is input first is executed first, and a processing which is input later is in a waiting state.

Specifically, while the scan processing utilizing the named pipe or the scan processing according to the scan instruction transmitted from the PC 50 is being executed, for example, a BUSY screen, not shown, is displayed on the panel 16 of the scanner 10, instead of the input waiting screen. Since the scan processing is being executed, information displayed on the BUSY screen includes a comment indicating that the scan processing according to the button operation cannot be executed. The scan-processing execution button is not displayed on the BUSY screen. As a result, the scan processing according to the button operation performed on the scanner 10 is in the waiting state.

When a scan instruction is received from the PC 50 while the scan processing utilizing the named pipe or the scan processing according to the button operation performed on the scanner 10 is being executed, for example, the scanner 10 transmits a BUSY status to the PC 50. As a result, an error is displayed on a display of the PC 50. Thus, a user of the PC 50 recognizes that another user is using the scanner 10, and waits for the scan processing.

While the scan processing according to the scan instruction transmitted from the PC 50 or the scan processing according to the button operation performed on the scanner 10 is being executed, for example, the read permissions for all the named pipes stored in the data storage area 28 are disallowed. As a result, the named pipe cannot be read, and an error is displayed during a reading processing. Thus, the user recognizes that another user is using the scanner 10, and waits for the scan processing.

While one of the scan processing utilizing the named pipe, the scan processing according to the scan instruction transmitted from the PC 50, and the scan processing according to the button operation performed on the scanner 10 is being executed, start triggers for the other two processings may be input. For example, while the scan processing according to the button operation performed on the scanner 10 is being executed, reception of the scan instruction from the PC 50 and reading of the named pipe may be performed. In this case, one of the scan processing utilizing the named pipe, and the scan processing according to the scan instruction transmitted from the PC 50 may be executed with a higher priority than the other according to a preset priority rule.

In this case, the priority rule may be set as desired. For example, the scan processing utilizing the named pipe (in the case where the USB storage class is used in reading of the named pipe) may be given a higher priority than the scan processing according to the scan instruction transmitted from the PC 50, the scan processing utilizing the named pipe (in the case where the SMB protocol is used in reading of the named pipe). Also, the scan processing according to the button operation performed on the scanner 10 may be given a higher priority than the scan processing utilizing the named pipe. A scan processing for which a start trigger has been input first may be given a higher priority between the scan processing utilizing the named pipe (in the case where the SMB protocol is used in reading of the named pipe) and the scan processing according to the scan instruction transmitted from the PC 50.

Scan Program

Each of the scan processing utilizing the named pipe, the scan processing according to the scan instruction transmitted from the PC 50, and the scan processing according to the button operation performed on the scanner 10 is executed by the CPU 12 of the scanner 10 according to the scan program 26. There will be next explained, with reference to FIGS. 2-8, flows of processings executed by the CPU 12 according to the scan program 26. It is noted that a flow in the setting mode is digressed from the essence of the present invention and will not be explained.

The scan program 26 is executed when the scanner 10 is started up. When the scan program 26 is executed, the flow begins with S100 at which a directory corresponding to the scan settings is created in the data storage area 28 of the scanner 10 if the directory does not exist. In this processing, the setting values for the scan processing which are set in the setting mode are set for each directory. For example, in the case where the print settings include resolutions of 300 dpi and 600 dpi and color scanning and monochrome scanning as a scan mode, directories are created as follows:

. . . /RESO300 dpi/color;
. . . /RESO300 dpi/mono;
. . . /RESO600 dpi/color; and
. . . /RESO600 dpi/mono The CPU 12 at S102 creates pipe monitoring processes corresponding to the lowest level of the above-described directory (S102). The CPU 12 at S104 determines whether all pipe monitoring processes each for the directories which is created at S100 and which is stored in the data storage area 28 have been created or not. When all the pipe monitoring processes are not created (S104: NO), this flow returns to S102. When all the pipe monitoring processes are created (S104: YES), the CPU 12 at S106 creates a command monitoring process. The CPU 12 at S108 creates a panel-operation monitoring process and at S110 creates an exclusion-monitoring and permission-setting process. As a result of the processings described above, the plurality of pipe monitoring processes, the command monitoring process, the panel-operation monitoring process, the exclusion-monitoring, and permission-setting process are executed in parallel.

Figure 3:
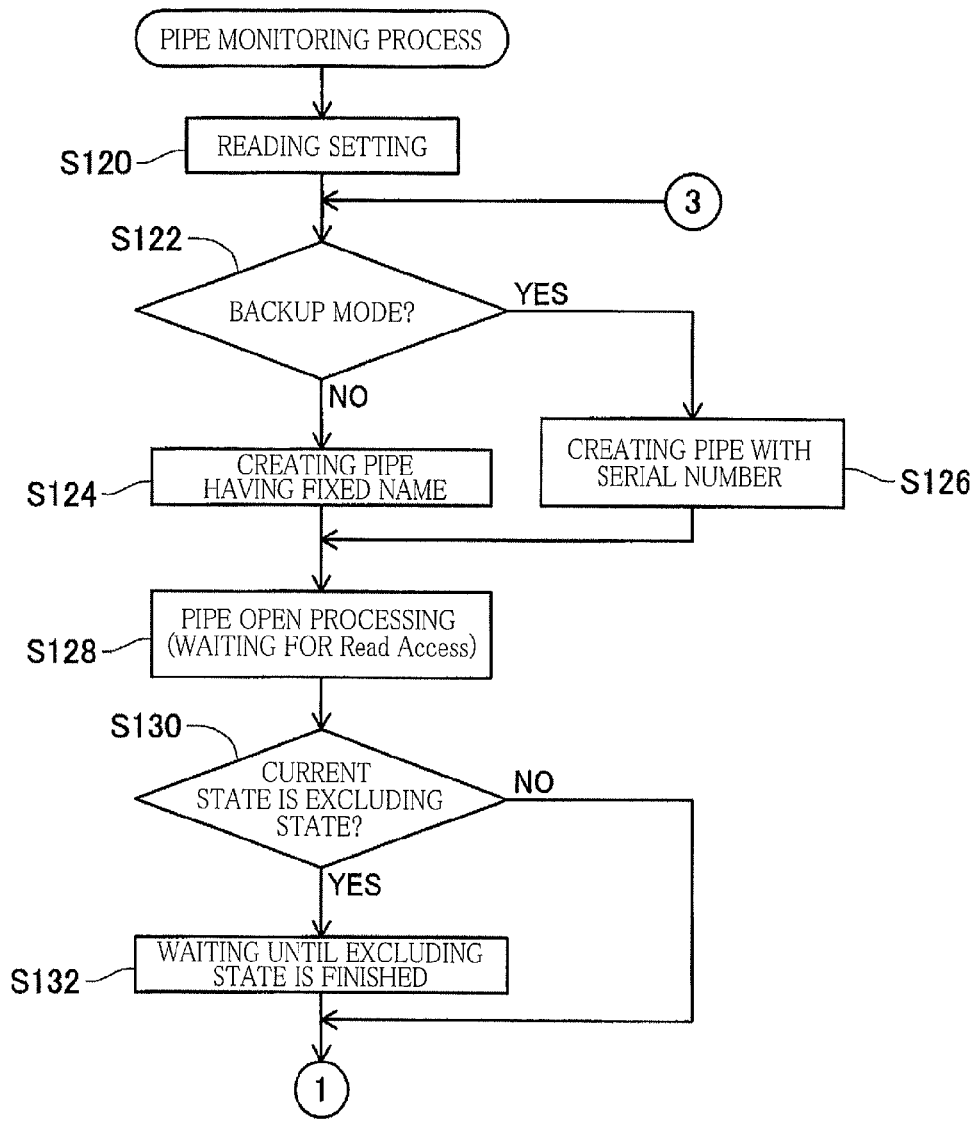
FIG. 3 is a flow chart illustrating processings executed by the scanner.
Figure 4:
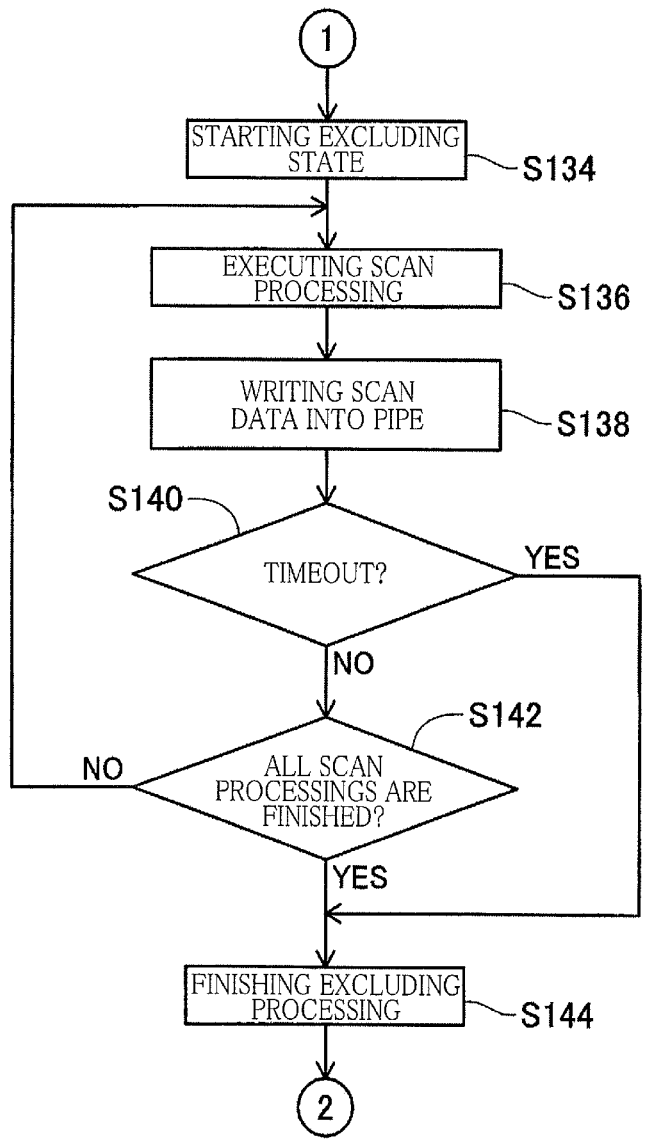
FIG. 4 is a flow chart illustrating processings executed by the scanner.
Figure 5:
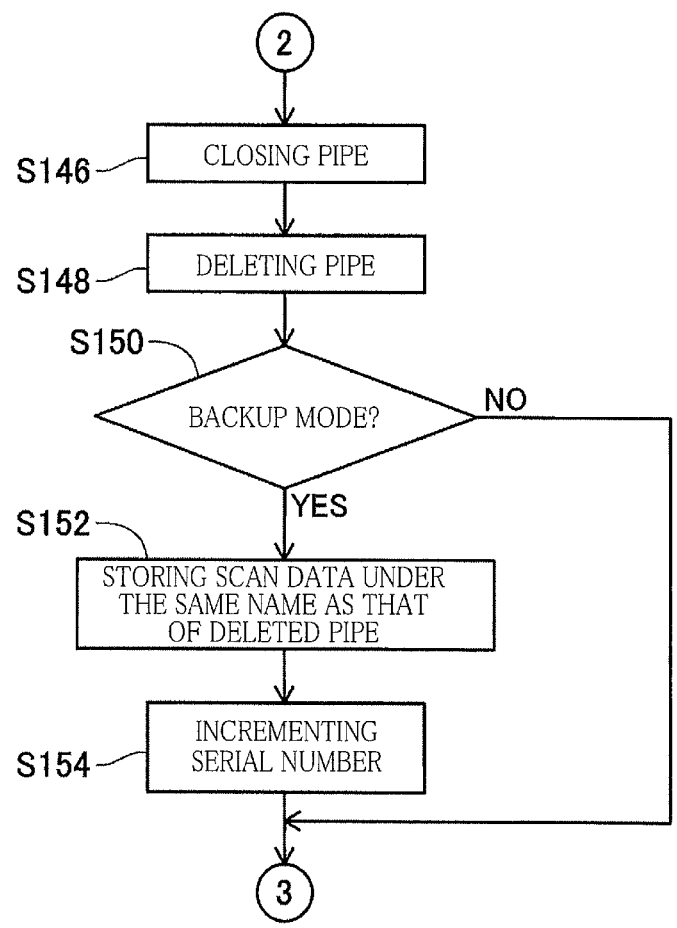
FIG. 5 is a flow chart illustrating processings executed by the scanner.

In each pipe monitoring process, as illustrated in FIG. 3, the CPU 12 at S120 reads the setting values for the scan processing which are set for each directory. The CPU 12 at S122 determines whether the backup mode is set in the setting mode or not. When the backup mode is not set (S122: NO), a named pipe having the fixed name is created at S124 in the corresponding directory. For example, in the case where this pipe monitoring process is created corresponding to the directory "/RESO300 dpi/color", this named pipe, the file name of which is fixed name, is created in the directory "/RESO300 dpi/color". When the backup mode is set (S122: YES), a named pipe whose pipe name contains information about a serial number is at S126 created in the directory.

When the named pipe is created, the CPU 12 at S128 executes a pipe open processing. In this processing, a writing-only mode and the blocking mode are designated. In the blocking mode, associated processings are stopped until writing is possible. In the case where an open processing is commanded in this mode, this open processing is switched to the blocking state (i.e., a processing-stopped state) until the named pipe is read. When this open processing is finished, in other words, when reading of the named pipe is requested from an external device (e.g., the image processing application program 46 of the PC 30), the pipe open processing is finished, and this flow goes to S130.

The CPU 12 at S130 determines whether the current state is an excluding state or not. The excluding state is a state in which when a start trigger for the scan processing is input, for example, when reading of the named pipe is requested from the external device in this case, execution of a scan processing in response to the start trigger is disallowed on condition that another scan processing has been executed. This excluding state is started at another Step.

When the current state is the excluding state (S130: YES), the CPU 12 at S132 waits until the excluding state is finished. When the excluding state is finished, this flow goes to S134. Also when the current state is not the excluding state (S130: NO), this flow goes to S134. The CPU 12 at S134 starts an excluding state. The CPU 12 at S136 executes a scan processing based on the setting values set in the directory storing the read named pipe. The CPU 12 at S138 writes the scan data created in the scan processing, into the named pipe.

The CPU 12 at S140 determines whether a predetermined length of time has passed from the reading of the named pipe or not. When the predetermined length of time has not passed (S140: NO), the CPU 12 at S142 determines whether all the scan processings are finished or not. When all the scan processings are not finished (S142: NO), this flow returns to S136. When all the scan processings are finished (S142: YES), this flow goes to S144. Also when the predetermined length of time has passed at S140 (S140: YES), this flow goes to S144. In this case, an incomplete image is read by the PC 30 as an error, and the image is normally determined as an invalid image and processed as an error by an application having read the image.

The CPU 12 at S144 finishes the excluding state. The named pipe used for the scan processing is at S146 switched to the inactive state. That is, the named pipe is closed. At S148, the closed named pipe is deleted from the directory. The CPU 12 at S150 determines whether the backup mode is set or not. When the backup mode is set (S150: YES), the CPU 12 at S152 stores the scan data under the same name as that of the deleted named pipe. The CPU 12 at S154 increments the serial number by one, and this flow returns to S122.

Figure 6:
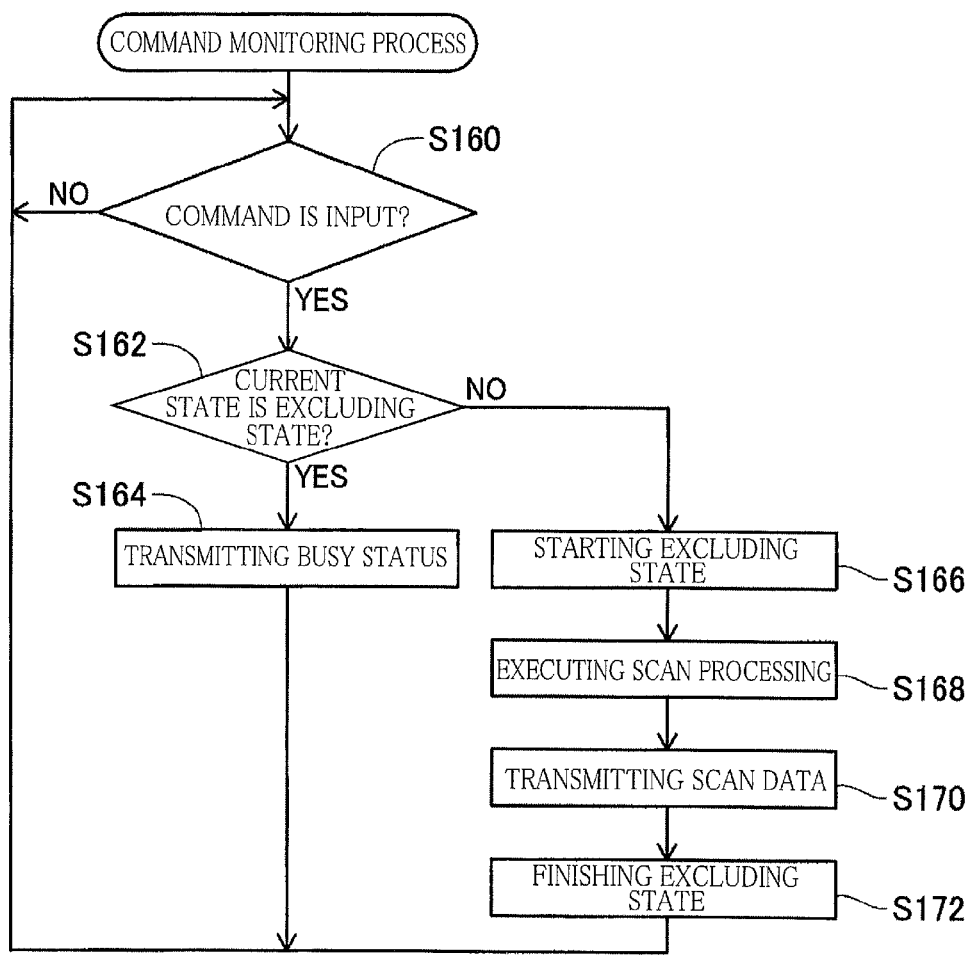
FIG. 6 is a flow chart illustrating processings executed by the scanner.

In the command monitoring process, as illustrated in FIG. 6, the CPU 12 at S160 determines whether a command such as a scan instruction has been input from the external device such as the PC 50 or not. When the command is not input (S160: NO), the CPU 12 repeats the processing at S160. When the command is input (S160: YES), the CPU 12 at S162 determines whether the current state is the excluding state or not. When the current state is the excluding state (S162: YES), the CPU 12 at S164 transmits the BUSY status to the external device having transmitted the command, and this flow returns to S160.

When the current state is not the excluding state (S162: NO), the CPU 12 at S166 starts an excluding state. The CPU 12 at S168 executes a scan processing based on the command. The CPU at S170 transmits scan data created in the scan processing, to the external device having transmitted the command. The CPU 12 at S172 finishes the excluding state, and this flow returns to S160.

Figure 7:
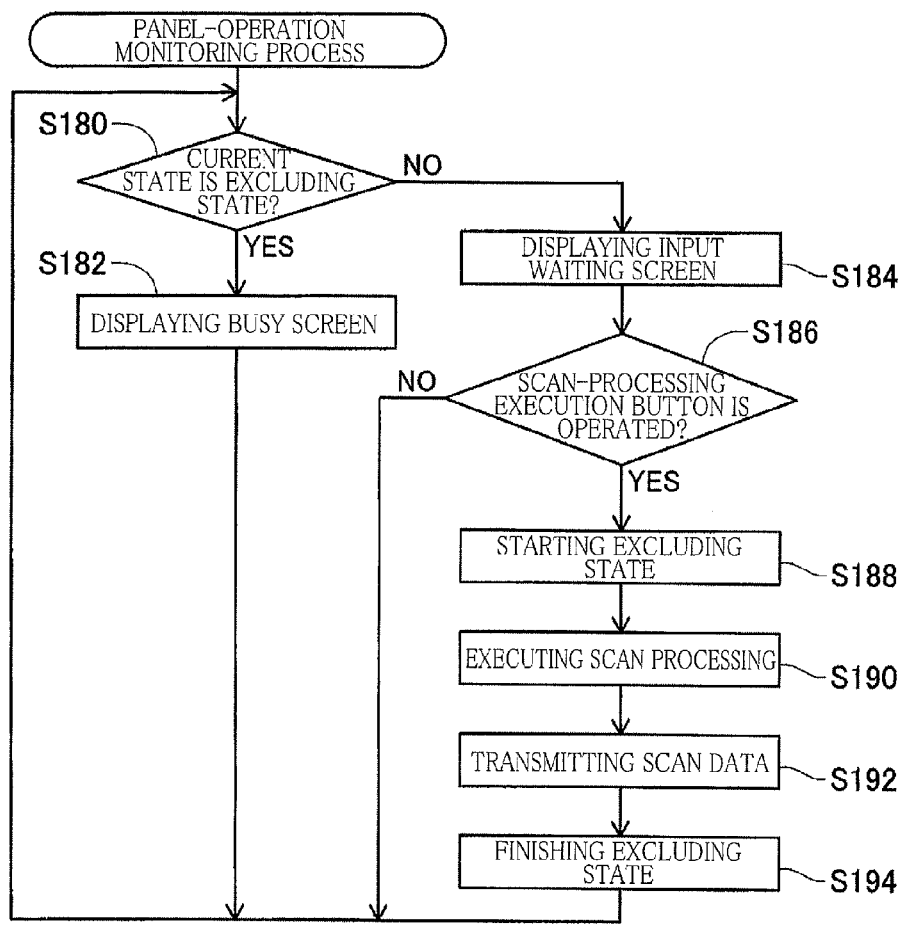
FIG. 7 is a flow chart illustrating processings executed by the scanner.

In the panel-operation monitoring process, as illustrated in FIG. 7, the CPU 12 at S180 determines whether the current state is the excluding state or not. When the current state is the excluding state (S180: YES), the CPU 12 at S182 controls the panel 16 of the scanner 10 to display the BUSY screen, and this flow returns to S180.

When the current state is not the excluding state (S180: NO), the CPU 12 at S184 controls the panel 16 of the scanner 10 to display the input waiting screen. The CPU 12 at S186 determines whether the scan-processing execution button has been operated on the input waiting screen or not. When the scan-processing execution button is operated (S186: YES), the CPU 12 at S188 starts an excluding state. The CPU 12 at S190 executes the scan processing. The CPU at S192 transmits the scan data created in the scan processing, to an external device registered in advance. The CPU 12 at S194 finishes the excluding state, and this flow returns to S180. It is noted that also when the scan-processing execution button is not operated at S186 (S186: NO), this flow returns to S180.

Figure 8:
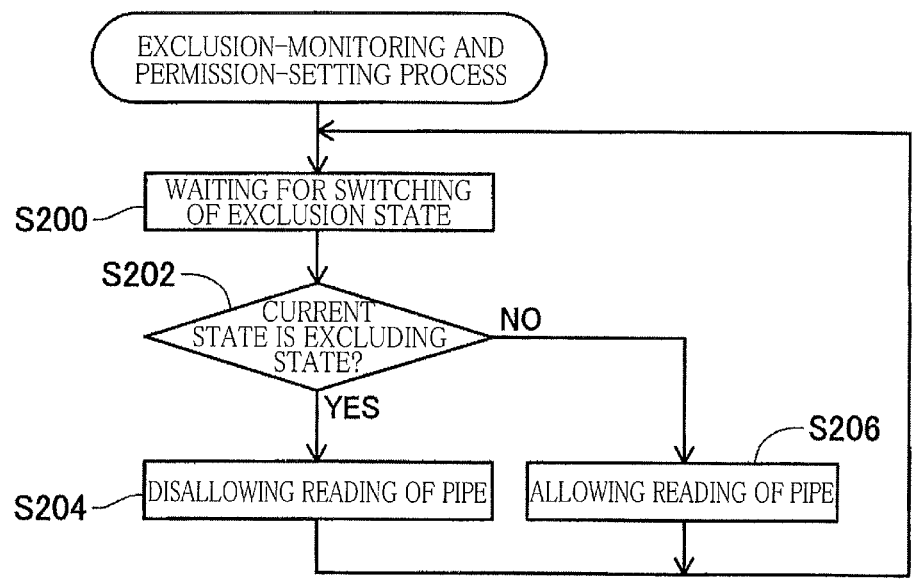
FIG. 8 is a flow chart illustrating processings executed by the scanner.

In the exclusion-monitoring and permission-setting process, as illustrated in FIG. 8, the CPU 12 at S200 waits for switching of the exclusion state. The CPU 12 at S202 determines whether the current state is the excluding state or not as a result of the switching of the exclusion state. When the current state is the excluding state (S202: YES), the CPU 12 at S204 disallows the read permission for the named pipe, and this flow returns to S200. It is noted that in the case where the excluding state is started at S134, in other words, in the case where the excluding state is started by reading of the pipe, reading of the pipe that is currently read is not disallowed in this pipe-reading disallowing processing at S204. When the current state is not the excluding state (S202: NO), the CPU 12 at S206 allows the read permission for the named pipe, and this flow returns to S200.

It is noted that the processing executed by the CPU 12 at S128 is one example of a determination processing. The processing executed by the CPU 12 at S136 is one example of a scan executing processing. The processing executed by the CPU 12 at S138 is one example of a scan-data writing processing. The processings executed by the CPU 12 at S124 and S126 are one example of a false-image-file creating processing. The processing executed by the CPU 12 at S146 is one example of a false-image-file closing processing. The processing executed by the CPU 12 at S204 is one example of a restricting processing. The processing executed by the CPU 12 at S206 is one example of a canceling processing.

Second Embodiment

While the named pipe is created in the data storage area 28 of the scanner 10 in the above-described embodiment, the named pipe may be created in the data storage area 48 of the PC 30. Specifically, authentication of the SMB protocol is performed between the scanner 10 and the PC 30. In the case where this authentication has succeeded, the scanner 10 acquires a permission for accessing the PC 30 and determines, based on the permission for accessing the PC 30, whether various kinds of data can be written into the data storage area 48 of the PC 30 or not. When the various kinds of data can be written into the data storage area 48, the scanner 10 creates a named pipe in the data storage area 48 of the PC 30. It is noted that in the case where the authentication of the SMB protocol has not succeeded between the scanner 10 and the PC 30 or in the case where various kinds of data cannot be written into the data storage area 48, an error screen is displayed on the panel 16 of the scanner 10.

When the named pipe is created in the data storage area 48 of the PC 30, the pipe open processing is executed as in the first embodiment. When reading of the named pipe is requested from the image processing application program 46 of the PC 30, the pipe open processing is finished, and the scanner 10 executes a scan processing. Scan data created in the scan processing is written, using the SMB protocol, into the named pipe created in the data storage area 48 of the PC 30. As thus described, the same effects as obtained in the first embodiment can be obtained by creating the named pipe in the data storage area 48 of the PC 30.

Figure 9:
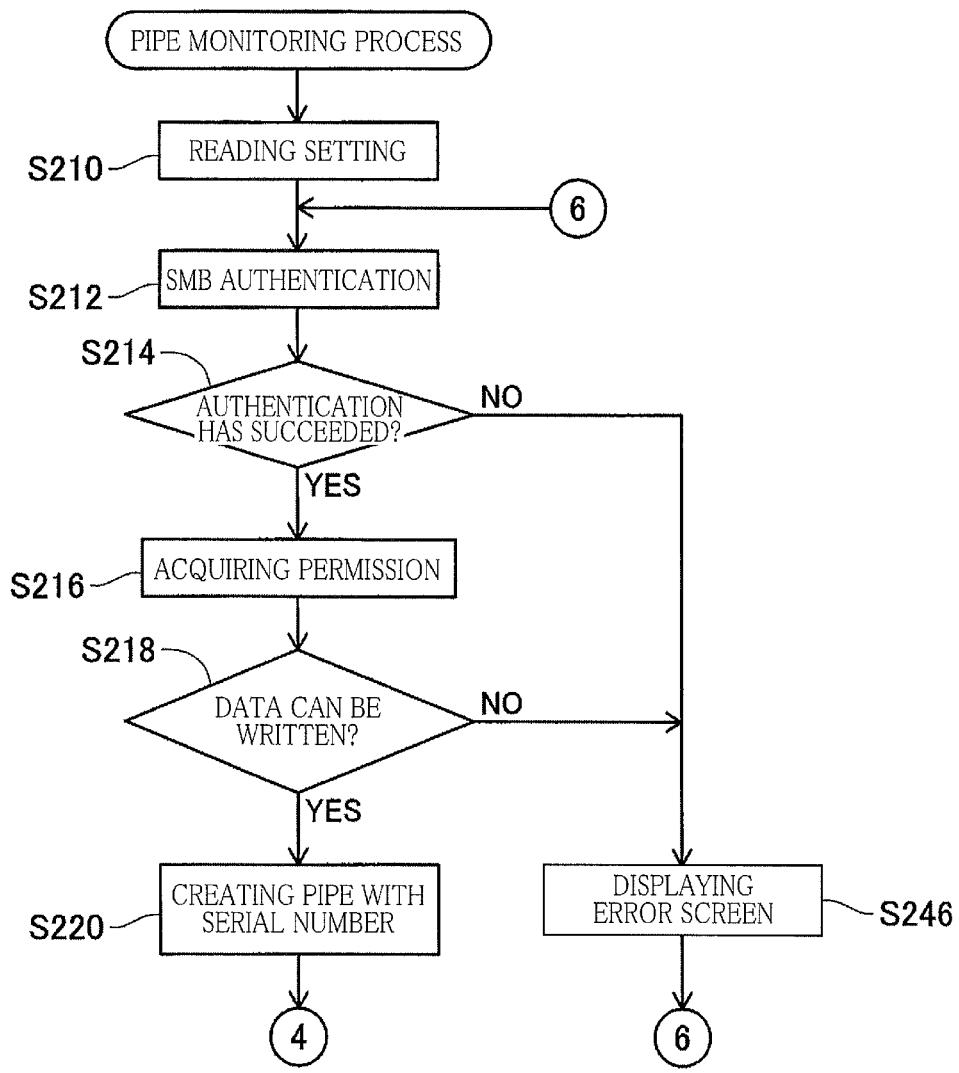
FIG. 9 is a flow chart illustrating processings executed by a scanner according to a second embodiment.
Figure 10:
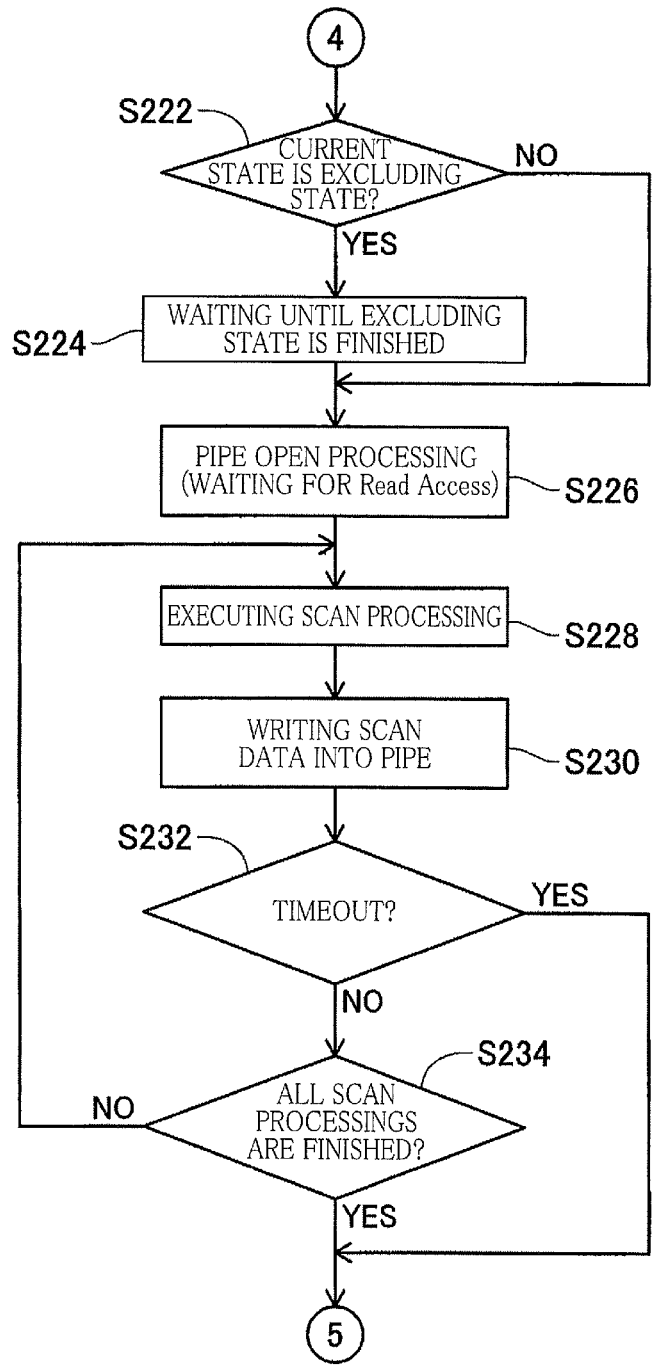
FIG. 10 is a flow chart illustrating processings executed by the scanner according to the second embodiment.
Figure 11:
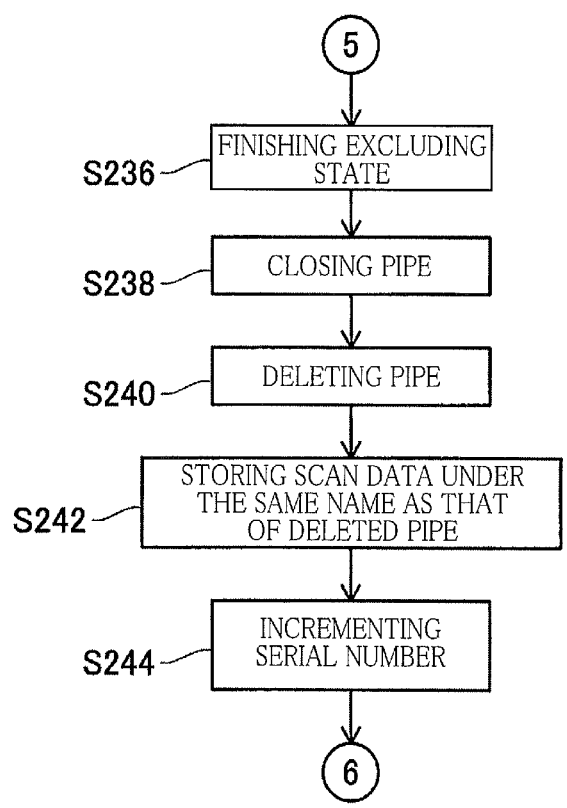
FIG. 11 is a flow chart illustrating processings executed by the scanner according to the second embodiment.

There will be next explained, with reference to FIGS. 9-11, a flow of processings executed by the CPU 12 according to the scan program 26 to execute the processings in the above-described second embodiment. It is noted that the flow which will be explained below is a pipe monitoring process which is executed instead of the pipe monitoring process illustrated in FIG. 2. It is noted that the present pipe monitoring process is executed in the state in which the backup mode is set.

In the present pipe monitoring process, as illustrated in FIG. 9, the CPU 12 at S210 reads setting values for a scan processing which are set for each directory. At S212, the authentication of the SMB protocol is performed between the scanner 10 and the PC 30. The CPU 12 at S214 determines whether the authentication of the SMB protocol has succeeded or not. When the authentication of the SMB protocol has succeeded (S214: YES), the scanner 10 at S216 acquires a permission for accessing the PC 30.

Based on the acquired permission, the CPU 12 at S218 determines whether various kinds of data can be written into the data storage area 48 of the PC 30 or not. When the various kinds of data can be written into the data storage area 48 of the PC 30 (S218: YES), a named pipe whose pipe name contains information about a serial number is at S220 created in the directory of the data storage area 48.

When the named pipe is created, the CPU 12 at S222 determines whether the current state is the excluding state or not. When the current state is the excluding state (S222: YES), the CPU 12 at S224 waits until the excluding state is finished. When the excluding state is finished, this flow goes to S226. Also when the current state is not the excluding state (S222: NO), this flow goes to S226. The CPU 12 at S226 executes a pipe open processing. The CPU 12 then executes processings at S228 and subsequent steps, but these processings are the same as the respective processings at S136-S148, S152, and S154 in the pipe monitoring process in the first embodiment, and an explanation of which is dispensed with.

It is noted that when the authentication of the SMB protocol has not succeeded at S214 (S214: NO) or when various kinds of data cannot be written into the data storage area 48 of the PC 30 at S218 (S218: NO), the CPU 12 at S246 controls the panel 16 of the scanner 10 to display an error screen, and this flow returns to S212.

It is noted that the processing executed by the CPU 12 at S226 is another example of the determination processing. The processing executed by the CPU 12 at S228 is another example of the scan executing processing. The processing executed by the CPU 12 at S230 is another example of the scan-data writing processing. The processing executed by the CPU 12 at S220 is another example of the false-image-file creating processing. The processing executed by the CPU 12 at S238 is another example of the false-image-file closing processing.

Third Embodiment

In the present embodiment, a named pipe which is assumed not to be used by the user can be deleted. For example, in the case where an error having occurred in the scanner 10 inhibits execution of a particular scan processing, a directory set for the particular scan processing is searched, and a named pipe stored in the searched directory is deleted. Specifically, in the case where the ADF is failed, and a scan processing cannot be executed for a document placed on the ADF, the CPU 12 searches a directory set for a scan processing for a document placed on the ADF and deletes a named pipe stored in the searched directory. A text file in which an error message has been written is created in the directory. As a result, in the case where reading is performed from the PC 30 to the directory by the user for scanning, for example, the user finds the text file in the directory instead of the pipe as the false image file. The error message contains a comment indicating that the scan processing using the ADF cannot be performed due to the failure in the ADF, and thereby the user of the PC 30 recognizes that the scan processing using the ADF cannot be performed.

In the case where the error is cleared, and thereby the particular scan processing can be restarted, the directory set for the particular scan processing is searched, and the text file in which the error message has been written is deleted from the searched directory. A named pipe is then created again in the directory. Specifically, in the case where the failed ADF is recovered, the directory set for the scan processing for the document placed on the ADF is searched, and the text file stored in the searched directory is deleted. A named pipe is then created again in the directory. As a result, the scan processing for the document placed on the ADF can be executed in the scan processing utilizing the named pipe.

Not only in the case where an error has occurred but also in the case where the scan processing utilizing the named pipe is being executed, named pipes other than the named pipe for which the scan processing is to be executed are also deleted. A text file in which a BUSY message has been written is created in a directory in which the deleted named pipe had been stored. The BUSY message contains a comment indicating that a new scan processing cannot be accepted because the scan processing is being executed. Having viewed the BUSY message, the user of the PC 30 recognizes that the scan processing cannot be executed at this time.

When the scan processing is finished, the named pipe which is deleted before is created again. Also, the text file in the directory for storing the named pipe created again is deleted. As a result, the scan processing utilizing the named pipe can be executed again.

Figure 12:
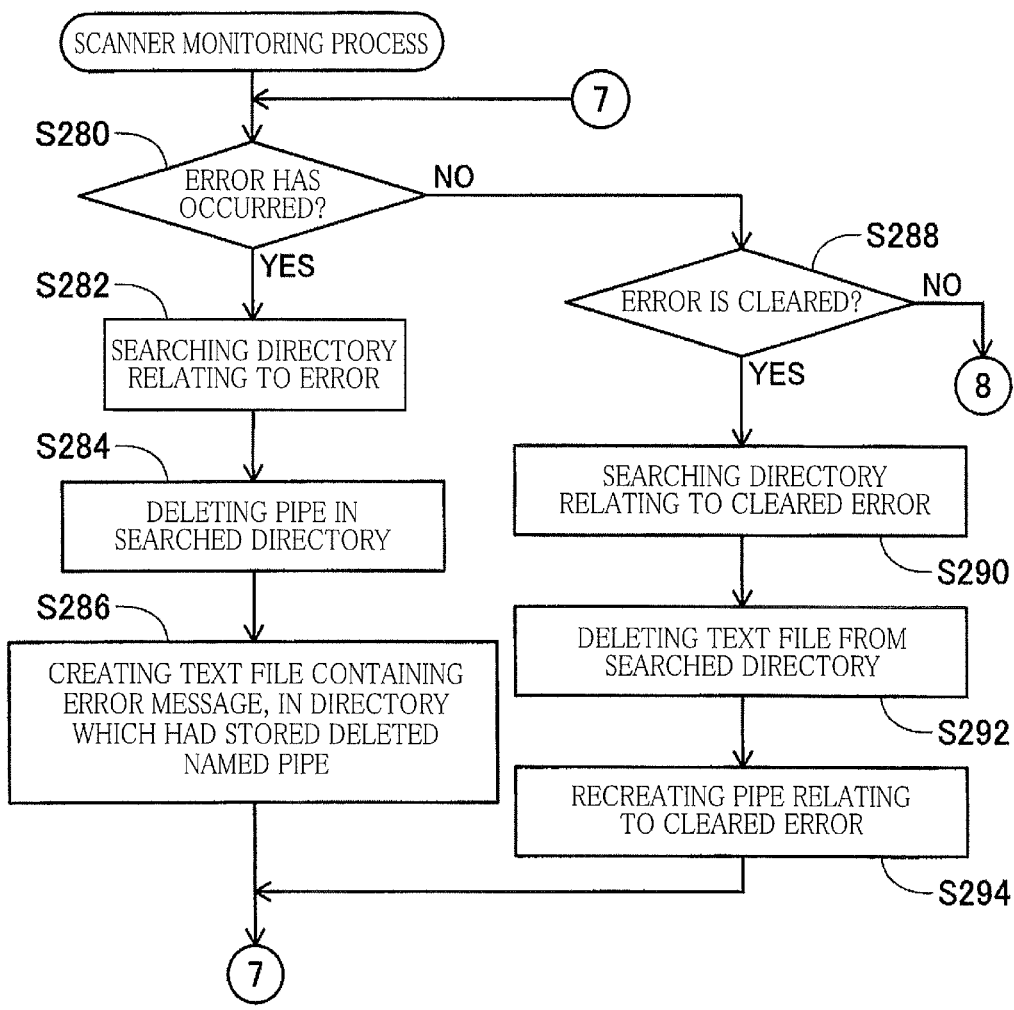
FIG. 12 is a flow chart illustrating processings executed by a scanner according to a third embodiment.
Figure 13:
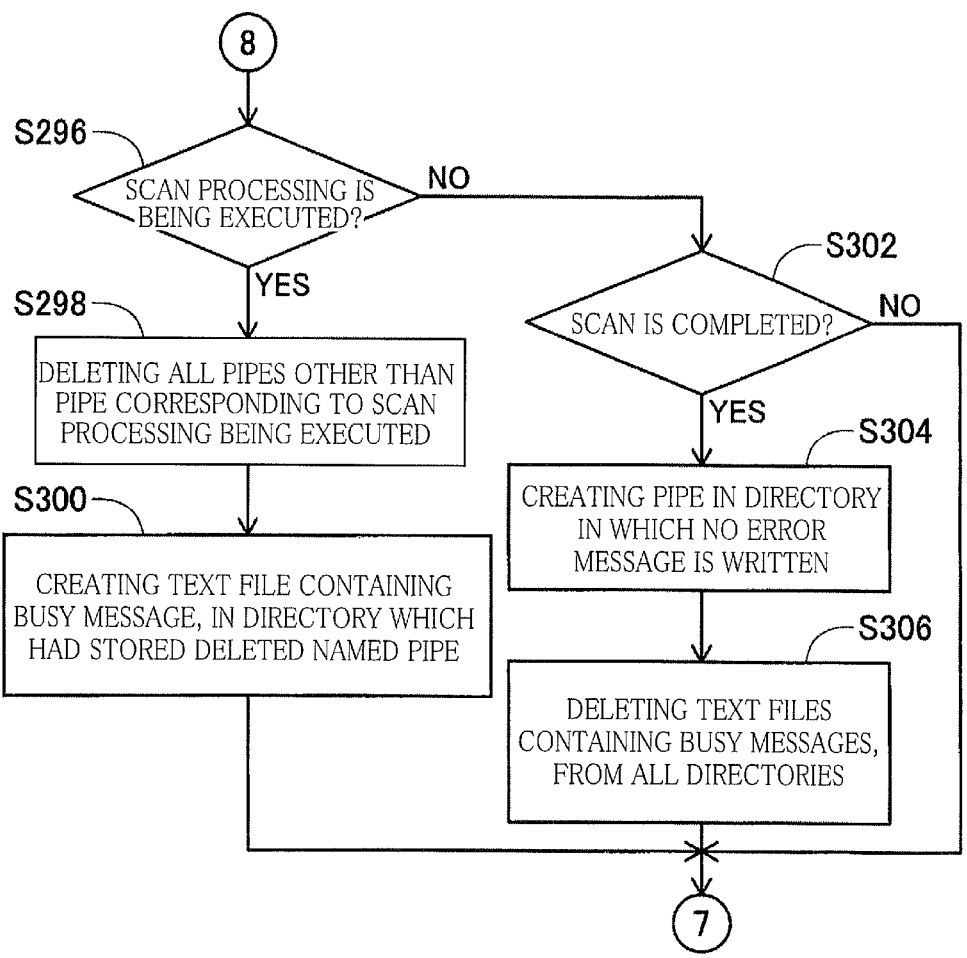
FIG. 13 is a flow chart illustrating processings executed by the scanner according to the third embodiment.

There will be next explained, with reference to FIGS. 12 and 13, a flow of processings executed by the CPU 12 according to the scan program 26 to execute the processings in the above-described third embodiment. It is noted that the flow which will be explained below is a scanner monitoring process and can be created after, e.g., the processing at S110 in the flow illustrated in FIG. 2. In the scanner monitoring process, as illustrated in FIG. 12, the CPU 12 at S280 determines whether an error has occurred in the scanner 10 or not.

When an error has occurred (S280: YES), the CPU 12 at S282 searches a directory set for setting values relating to the error. The CPU 12 at S284 deletes a named pipe stored in the searched directory. The CPU 12 at S286 creates text file in which an error message has been written, in the directory which had stored the deleted named pipe, and this flow returns to S280.

When an error has not occurred at S280 (S280: NO), the CPU 12 at S288 determines whether the error has been cleared or not. When the error is cleared (S288: YES), the CPU 12 at S290 searches the directory set for the setting values relating to the cleared error. The CPU 12 at S292 deletes the text file stored in the searched directory. The CPU 12 at S294 creates the named pipe again in the searched directory, and this flow returns to S280.

When the error is not cleared at S288 (S288: NO), the CPU 12 at S296 determines whether the scan processing utilizing the named pipe is being executed or not. When the scan processing is being executed (S296: YES), the CPU 12 at S298 deletes all the named pipes other than the named pipe corresponding to the scan processing being executed. The CPU 12 at S300 creates a text file in which a BUSY message is written, in the directory that had stored the deleted named pipe, and this flow returns to S280.

When the scan processing is not being executed at S296 (S296: NO), the CPU 12 at S302 determines whether the scan processing is completed or not. When the scan processing is completed (S302: YES), the CPU 12 at S304 creates the named pipe again in a directory in which no error message is written. The CPU 12 at S306 deletes the text files containing the BUSY messages, from all the directories, and this flow returns to S280.

It is noted that the processing executed by the CPU 12 at S280 is one example of a state acquiring processing. The processing executed by the CPU 12 at S284 is one example of a pseudo-image-file deleting processing. In the above-described embodiment, causes (e.g., an error and "BUSY") of hindrance to scanning are not detected at the same time but may be detected at the same time. In this case, in the case where the directory has already stored the text file in which the error message has been written, a message for another cause newly detected is additionally written into the text file. In this case, where the cause is cleared, the CPU 12 deletes only the error message relating to the cleared cause. In the case where all the error messages are deleted, the CPU 12 deletes the text file and creates a named pipe again in the directory.

Fourth Embodiment

In the above-described embodiments, the CPU executes the scan processing utilizing the named pipe, i.e., the pseudo image file provided virtually. However, the CPU may monitor a processing command provided for the file system and change processings as needed. In the case where the scanner and the PC are connected to each other using USB, the file is processed using a command of the storage class in most cases. In connection over the network, the file is processed using a command according to the SMB protocol. The CPU monitors these commands, and when the CPU determines that a request for reading the file is received, the CPU transmits a file of a read image as a response. Specifically, an empty image file (hereinafter may be referred to as "scan activation file") is created in advance in a directory stored in the data storage area 28 of the scanner 10. This scan activation file is attached with an extension representative of image data such as JPG. An image format representative of the extension coincides with that of the scan data. In the case where the scan activation file is read, a scan processing is executed. It is noted that determination of whether the scan activation file has been read or not is performed not based on whether the scan activation file has actually been read or not (that is, whether the scan activation file has been accessed or not) but based on a command used when reading the scan activation file. That is, the CPU monitors a command input to the scanner 10 and determines whether the input command is for the scan activation file or not. When the input command is for the scan activation file, the CPU determines whether a content of the command is reading of the file or not. When the content of the command is the reading of the file, the CPU determines that the scan activation file is to be read.

When the scan activation file is to be read, the scanner 10 executes a scan processing. A file based on the scan data created in the scan processing is then transmitted to an external device having transmitted the command, as a file for which the reading processing is executed. As thus described, the same effects as obtained in the first embodiment can be obtained by using a normal file instead of the named pipe.

Figure 14:
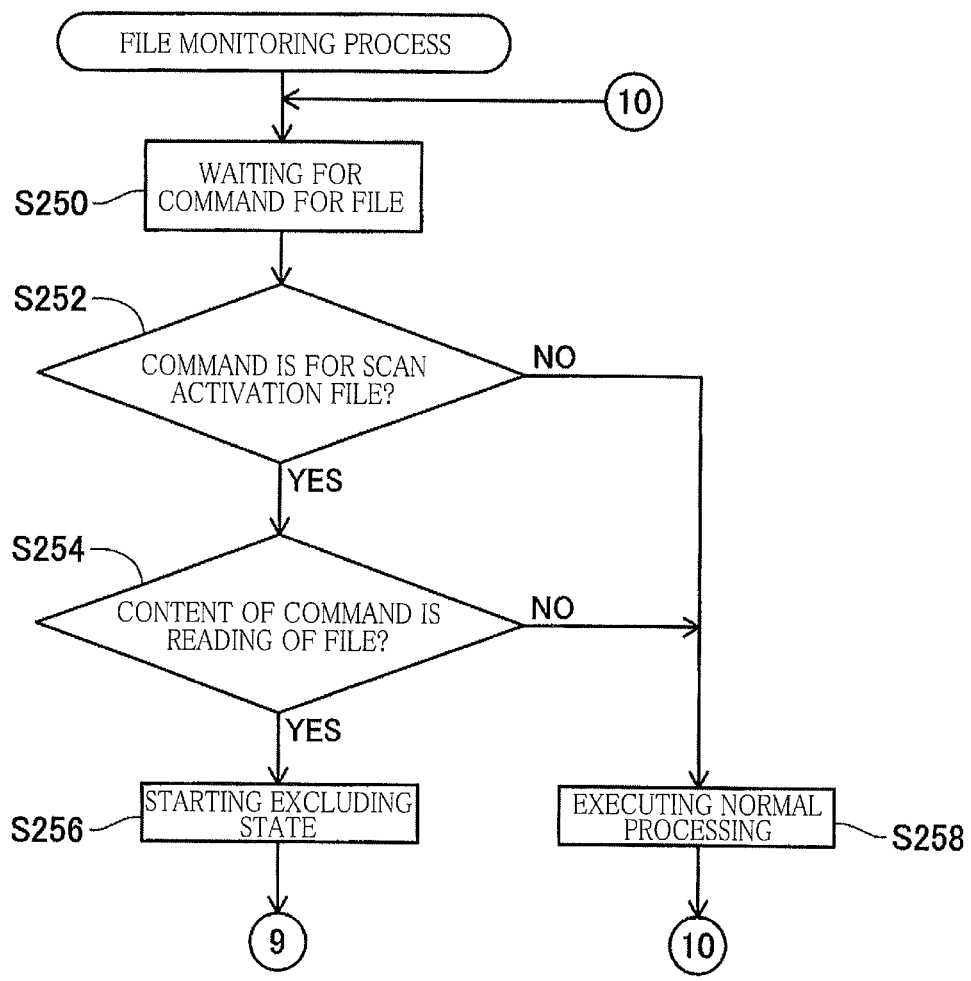
FIG. 14 is a flow chart illustrating processings executed by a scanner according to a fourth embodiment.
Figure 15:
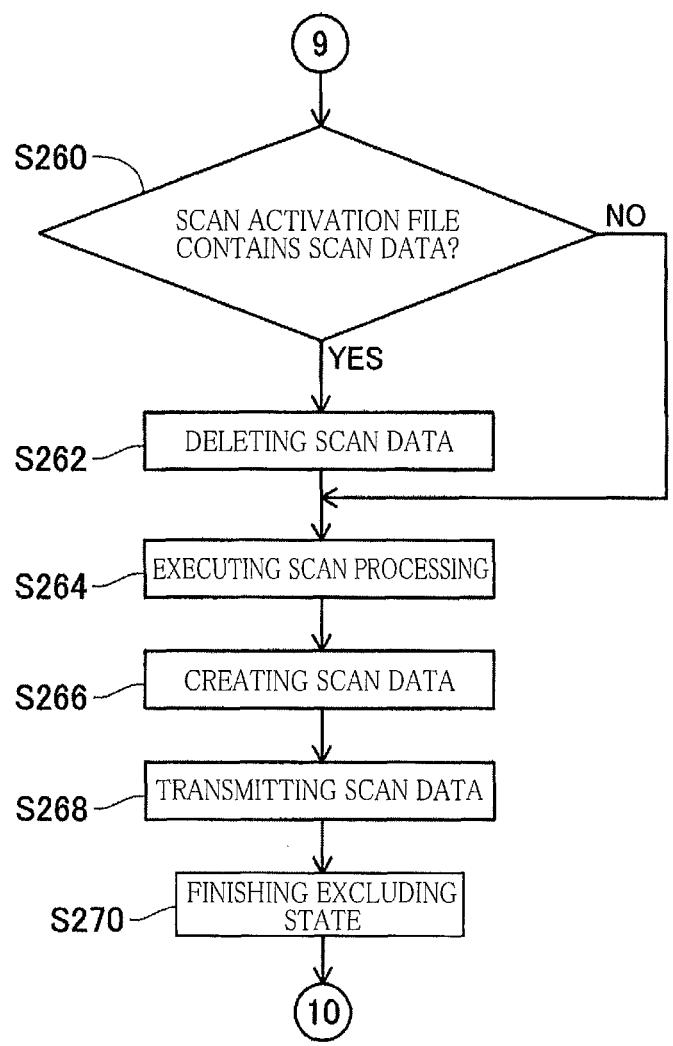
FIG. 15 is a flow chart illustrating processings executed by the scanner according to the fourth embodiment.

There will be next explained, with reference to FIGS. 14 and 15, a flow of processings executed by the CPU 12 according to the scan program 26 to execute the processings in the above-described fourth embodiment. It is noted that the flow which will be explained below is a file monitoring process which is created in the flow in FIG. 2 instead of the pipe monitoring process. This flow is for explaining a concept and does not coincide with the actual command of the USB storage class or the SMB protocol.

In the file monitoring process, as illustrated in FIG. 14, this flow begins with S250 at which the CPU 12 waits for input of a command of the SMB protocol or the USB storage class for a file stored in the scanner 10. The CPU 12 at S252 determines whether the input command is for the scan activation file or not. When the command is for the scan activation file (S252: YES), the CPU 12 at S254 determines whether the content of the command is reading of the file or not. When the content of the command is the reading of the file (S254: YES), the CPU 12 at S256 starts an excluding state.

The CPU 12 at S260 determines whether the scan activation file contains scan data or not. This file is an empty image file as an initial value, but in the case where this function has already been used, this file may store an image created in the previous scanning. When the scan activation file contains scan data (S260: YES), the CPU 12 at S262 deletes the scan data, and this flow goes to S264. When the scan activation file contains no scan data (S260: YES), this flow goes to S264 at which the CPU 12 executes a scan processing.

The CPU 12 at S266 creates scan data in the scan processing and stores the created scan data as the scan activation file. The CPU 12 at S268 transmits the scan data to an external device having transmitted the command, as a response to the file reading processing. The CPU 12 at 270 finishes the excluding state, and this flow returns to S250.

When the command is not for the scan activation file at S252 (S252: NO) or when the content of the command is not the reading of the file at S254 (S254: NO), the CPU 12 at S258 executes a normal processing based on the command, and this flow returns to S250.

It is noted that the processings executed by the CPU 12 at S252 and S254 are one example of a reception determining processing. The processing executed by the CPU 12 at S264 is another example of the scan executing processing. The processing executed by the CPU 12 at S268 is one example of a scan-data transmitting processing.

While the embodiments have been described above, it is to be understood that the disclosure is not limited to the details of the illustrated embodiments, but may be embodied with various changes and modifications, which may occur to those skilled in the art, without departing from the spirit and scope of the disclosure. Specifically, the scan data is acquired in the case where the named pipe is read by the execution of the image processing application program 46 by the PC 30 in the above-described embodiment, for example. However, the CPU can acquire the scan data by reading of the named pipe during execution of a program such as a document creating program and a print processing program.

In the above-described embodiment, the excluding state is started in the case where the scanner 10 has received the scan instruction from the PC 50 when the scan processing is executed according to the scan instruction transmitted from the PC 50. However, this communication system 1 may be configured such that when the scanner driver is executed in the PC 50, the PC 50 transmits a predetermined signal to the scanner 10, and when having received the predetermined signal, the scanner 10 starts the excluding state. That is, the scanner 10 may start the excluding state by execution of the scanner driver in the PC 50.

In the above-described embodiments, the processings illustrated in FIGS. 2-15 are executed by the CPU 12. These processings do not need to be executed by the CPU 12 and may be executed by an ASIC or another or other similar logical integrated circuits and may be executed by cooperation of the CPU, the ASIC, and the logical integrated circuit, for example.

What is claimed is:
1. A scanner, comprising:
a communication device communicable with an information processing device; and
a controller configured to cause the scanner to execute:
   a determination processing in which the scanner determines whether a reading request which is a request for reading a pseudo image file is received from the information processing device;
   a scan executing processing in which the scanner executes a scan processing when the scanner determines that the reading request for reading the pseudo image file is received in the determination processing; and
   a scan-data writing processing in which the scanner writes scan data created in the scan executing processing, into the pseudo image file, wherein the controller is configured to cause the scanner to execute a pseudo-image-file creating processing in which the scanner creates the pseudo image file, wherein in the pseudo-image-file creating processing, the scanner creates the pseudo image file in association with one of a plurality of setting values set for the scan executing processing, wherein in the scan executing processing, the scanner executes the scan processing using a setting value associated with the pseudo image file for which the scanner determines that the reading request is received in the determination processing, and wherein the controller is configured to cause the scanner to further execute:
- a state detecting processing in which the scanner detects a state of the scanner; and
- a pseudo-image-file deleting processing in which the scanner deletes the pseudo image file created in the pseudo-image-file creating processing and created in association with a particular setting value, in a case where the scanner is not allowed to execute the scan processing using the particular setting value in the state detected in the state acquiring processing.

2. The scanner according to claim 1, wherein the controller is configured to cause the scanner to execute a pseudo-image-file closing processing in which the scanner closes the pseudo image file after the scan data is written into the pseudo image file in the scan-data writing processing and the pseudo image file is read by the information processing device.

3. The scanner according to claim 1,
wherein in the scan executing processing, the scanner executes one of a first scan processing based on the reading request for reading the pseudo image file, and a second scan processing different from the first scan processing, and
wherein the controller is configured to cause the scanner to execute a restricting processing in which the scanner restricts execution of the first scan processing in the scan executing processing when the second scan processing is being executed.

4. The scanner according to claim 1, wherein in the determination processing, the scanner determines whether the reading request for reading the pseudo image file using one of a USB storage class and a protocol for file sharing over a network is received.

5. The scanner according to claim 1, wherein the pseudo image file is a named pipe.

6. The scanner according to claim 1, wherein in the determination processing the scanner determines whether the reading request for reading the pseudo image file using one of a USB storage class and a protocol for file sharing over a network is received.

7. The scanner according to claim 1, wherein the pseudo image file is a named pipe.

8. A non-transitory storage medium storing a plurality of instructions executable by a processor of a scanner, the scanner comprising a communication device communicable with an information processing device,
the plurality of instructions, when executed by the processor, causing the scanner to execute:
- a determination processing in which the scanner determines whether a reading request which is a request for reading a pseudo image file is received from the information processing device;
- a scan executing processing in which the scanner executes a scan processing when the scanner determines that the reading request for reading the pseudo image file is received in the determination processing; and
- a scan-data writing processing in which the scanner writes scan data created in the scan executing processing, into the pseudo image file, wherein the instructions, when executed, further cause the scanner to execute a pseudo-image-file creating processing in which the scanner creates the pseudo image file, wherein in the pseudo-image-file creating processing, the scanner creates the pseudo image file in association with one of a plurality of setting values set for the scan executing processing, wherein in the scan executing processing, the scanner executes the scan processing using a setting value associated with the pseudo image file for which the scanner determines that the reading request is received in the determination processing, and wherein the instructions, when executed, further cause the scanner to execute:
- a state detecting processing in which the scanner detects a state of the scanner; and
- a pseudo-image-file deleting processing in which the scanner deletes the pseudo image file created in the pseudo-image-file creating processing and created in association with a particular setting value, in a case where the scanner is not allowed to execute the scan processing using the particular setting value in the state detected in the state acquiring processing.

9. The scanner according to claim 8, wherein the instructions, when executed, further cause the scanner to execute a pseudo-image-file closing processing in which the scanner closes the pseudo image file after the scan data is written into the pseudo image file in the scan-data writing processing and the pseudo image file is read by the information processing device.

10. The scanner according to claim 8,
wherein in the scan executing processing, the scanner executes one of a first scan processing based on the reading request for reading the pseudo image file, and a second scan processing different from the first scan processing, and
wherein the instructions, when executed, further cause the scanner to execute a restricting processing in which the scanner restricts execution of the first scan processing in the scan executing processing when the second scan processing is being executed.

11. The scanner according to claim 10, wherein in the restricting processing, the scanner restricts the execution of the first scan processing in the scan executing processing by disallowing reception of the reading request for reading the pseudo image file.

12. The scanner according to claim 10, wherein the instructions, when executed, further cause the scanner to execute a canceling processing in which, when the second scan processing is finished, the scanner cancels restriction of the execution of the first scan processing in the restricting processing.

* * * * *